(12) United States Patent
Elsloo

(10) Patent No.: US 11,706,188 B2
(45) Date of Patent: Jul. 18, 2023

(54) LOCALIZATION FOR DOMAIN NAME RESOLUTION

(71) Applicant: Comcast Cable Communications, LLC, Philadelphia, PA (US)

(72) Inventor: Jeff Elsloo, Centennial, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/119,231

(22) Filed: Aug. 31, 2018

(65) Prior Publication Data

US 2020/0076763 A1    Mar. 5, 2020

(51) Int. Cl.
*H04L 61/4511* (2022.01)
*H04L 61/3015* (2022.01)
*H04L 67/52* (2022.01)

(52) U.S. Cl.
CPC ...... *H04L 61/4511* (2022.05); *H04L 61/3025* (2013.01); *H04L 67/52* (2022.05)

(58) Field of Classification Search
CPC ... H04L 61/1511; H04L 61/3025; H04L 67/18
USPC .......................................... 709/245–247, 217
See application file for complete search history.

(56) References Cited

U.S. PATENT DOCUMENTS

| | | | | |
|---|---|---|---|---|
| 9,548,927 B2* | 1/2017 | Luke | ...................... | H04L 47/125 |
| 9,852,446 B2* | 12/2017 | Field | ...................... | H04L 67/025 |
| 10,110,614 B2* | 10/2018 | Kaliski, Jr. | ........... | H04L 63/126 |
| 10,326,700 B1* | 6/2019 | Koenning | ........... | H04L 41/0893 |
| 10,484,232 B2* | 11/2019 | Hesketh | ............... | H04L 67/1014 |
| 10,785,192 B2* | 9/2020 | Govindarajan | .......... | H04L 63/10 |
| 2004/0039798 A1* | 2/2004 | Hotz | ................... | H04L 61/1511 709/219 |
| 2004/0083307 A1* | 4/2004 | Uysal | ...................... | H04L 67/18 709/246 |
| 2006/0112176 A1* | 5/2006 | Liu | .................... | H04L 29/12811 709/245 |
| 2006/0129665 A1* | 6/2006 | Toebes | ................ | H04L 67/1019 709/223 |
| 2007/0208877 A1* | 9/2007 | Kelley | .................... | H04L 61/00 709/245 |
| 2009/0164661 A1* | 6/2009 | Kim | .................... | H04L 67/1002 709/238 |

(Continued)

FOREIGN PATENT DOCUMENTS

JP       2003115861 A  *  4/2003
WO  WO-2020245568 A1 * 12/2020    ......... G06F 16/9027

OTHER PUBLICATIONS

Ballintijn, Gerco, Maarten Van Steen, and Andrew S. Tanenbaum. "Scalable human-friendly resource names." IEEE Internet Computing 5, No. 5 (2001): 20-27. (Year: 2001).*

(Continued)

*Primary Examiner* — Jeffrey R Swearingen
(74) *Attorney, Agent, or Firm* — Banner & Witcoff, Ltd.

(57) ABSTRACT

Systems, apparatuses, and method are described for resolving domain names based on localization. A computing device may send, to a name server, a request indicating a domain. The name server may determine one or more servers associated with the domain based on the locations of the one or more servers and/or the computing device. The name server may send, to the computing device, a message indicating the determined one or more servers.

26 Claims, 8 Drawing Sheets

(56) References Cited

U.S. PATENT DOCUMENTS

| | | | | |
|---|---|---|---|---|
| 2012/0017090 | A1* | 1/2012 | Gould | H04L 63/12 713/176 |
| 2012/0272337 | A1* | 10/2012 | Velasco | G06F 21/62 726/28 |
| 2013/0041972 | A1* | 2/2013 | Field | H04L 29/08729 709/213 |
| 2013/0179541 | A1* | 7/2013 | Chen | H04L 65/4084 709/219 |
| 2013/0227167 | A1* | 8/2013 | Prince | H04L 61/1511 709/238 |
| 2013/0268649 | A1* | 10/2013 | Kinra | H04L 41/0668 709/224 |
| 2013/0297596 | A1* | 11/2013 | Mouline | G06F 16/9537 707/723 |
| 2014/0280803 | A1* | 9/2014 | Kazerani | H04L 41/5067 709/224 |
| 2015/0256508 | A1* | 9/2015 | Townsend | H04L 61/1511 709/245 |
| 2019/0044787 | A1* | 2/2019 | Richardson | H04L 67/10 |
| 2019/0158605 | A1* | 5/2019 | Markuze | H04L 69/163 |
| 2021/0144517 | A1* | 5/2021 | Guim Bernat | H04W 12/04 |

OTHER PUBLICATIONS

Gieben, R., and W. Mekking. "Authenticated Denial of Existence in the DNS." RFC 7129 (2014). pp. 11-14 (Year: 2014).*

"Anycast." Wikipedia, Mar. 15, 2019, https://en.wikipedia.org/wiki/Anycast.

"Amazon Route 53: Overview." Amazon Web Services, 2019, https://aws.amazon.com/route53/.

"Amazon Route 53." Wikipedia, Mar. 15, 2019, https://en.wikipedia.org/wiki/Amazon_Route_53.

"Amazon Route 53: Choosing a Routing Policy." Amazon Web Services, Apr. 1, 2013, https://docs.aws.amazon.com/Route53/latest/DeveloperGuide/routing-policy.html.

"Amazon Route 53: Values for Geolocation Records." Amazon Web Services, Apr. 1, 2013, https://docs.aws.amazon.com/Route53/latest/DeveloperGuide/resource-record-sets-values-geo.html.

"How Do I Direct Traffic to Specific Resources or AWS Regions Based on the Query's Geographic Location?" Amazon Web Services, 2019, https://aws.amazon.com/premiumsupport/knowledge-center/geolocation-routing-policy/.

"Amazon Route 53 Product Details." Amazon Web Services, 2019, https://aws.amazon.com/route53/details/.

"Amazon Route 53 FAQs." Amazon Web Services, 2019, https://aws.amazon.com/route53/faqs/.

"Amazon Route 53: Supported DNS Record Types." Amazon Web Services, Apr. 1, 2013, https://docs.aws.amazon.com/Route53/latest/DeveloperGuide/ResourceRecordTypes.html.

Abbott, Chase, "What is BIG-IP DNS?" DevCentral, Mar. 15, 2018, https://devcentral.f5.com/articles/what-is-big-ip-dns-26999.

"F5 GTM and Wide IP." DevCentral, Jul. 19, 2014, https://devcentral.f5.com/questions/f5-gtm-and-wide-ip.

"About Global Server Load Balancing." F5 Networks, Mar. 11, 2019, https://support.f5.com/kb/en-us/products/big-ip_gtm/manuals/product/gtm-concepts-11-5-0/1.html.

"BIG-IP GTM Configuration." F5 Networks, Mar. 11, 2019, https://support.f5.com/kb/en-us/products/big-ip_gtm/manuals/product/gtm-concepts-11-5-0/4.html.

"Products: Global Server Load Balancing." F5 Networks, 2019, https://www.f5.com/products/global-server-load-balancing-gslb.

"EDNS Client Subnet." Wikipedia, Jul. 27, 2018, https://en.wikipedia.org/wiki/EDNS_Client_Subnet.

C. Contavalli, W. van der Gaast, D. Lawrence, and W. Kumari, "Client Subnet in DNS Queries." Internet Engineering Task Force, May 2016, https://tools.ietf.org/html/rfc7871.

"EDNS Client Subnet (ECS) FAQs & Information." Oracle + Dyn, Sep. 2015, https://help.dyn.com/edns-client-subnet-faq-info/.

"How It Works." A Faster Internet—The Global Internet Speedup, http://www.afasterinternet.com/howitworks.htm.

"Content Delivery Network." Comcast Cable Communications Management, 2019, https://www.comcasttechnologysolutions.com/our-portfoliovideo-platform/content-delivery-network.

D. Davidowicz, "DNSSEC." 1999, http://compsec101.antibozo.net/papers/dnssec/dnssec.html.

"Online DNS Record Viewer." Online Domain Tools, http://dns-record-viewer.online-domain-tools.com/0.

"MaxMind: Home." MaxMind, https://www.maxmind.com/en/home.

* cited by examiner

LOCALIZATION FOR DOMAIN NAME RESOLUTION

BACKGROUND

A user may type in a domain name of a web site, such as "www.example.com," to a browser, and the browser may send the domain name to a resolver, which may query a name server to translate the domain name into an Internet Protocol (IP) address (e.g., 172.16.254.1). There may be multiple levels in a hierarchy associated with the domain name. For example, the domain name "www.example.com" belongs to a "com" top-level domain, and an "example" lower level domain.

A resolver may query name servers at various levels of a domain name hierarchy to determine an IP address that corresponds to a particular domain name. As the quantity of name servers at a particular level of the domain name hierarchy increases, their deployment distributed in various geographical regions, the resolver might not be aware that there is a closer name server at that domain name level. If the resolver sends its request to a name server that is farther away, this may lead to higher latency in resolving the domain name.

SUMMARY

The following summary presents a simplified summary of certain features. The summary is not an extensive overview and is not intended to identify key or critical elements.

Systems, apparatuses, and methods are described for resolving domain names based on localization. A name server for a domain may receive, from a computing device, a request to determine servers for a subordinate level domain. The name server may determine the location of the computing device, and may determine one or more servers for the subordinate level domain that are local to the computing device. The name server may send, to the computing device, a message indicating the determined one or more servers for the subordinate level domain. In this manner, the computing device may query servers for the subordinate level domain that are local to the computing device, and the latency in resolving domain names may be reduced.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
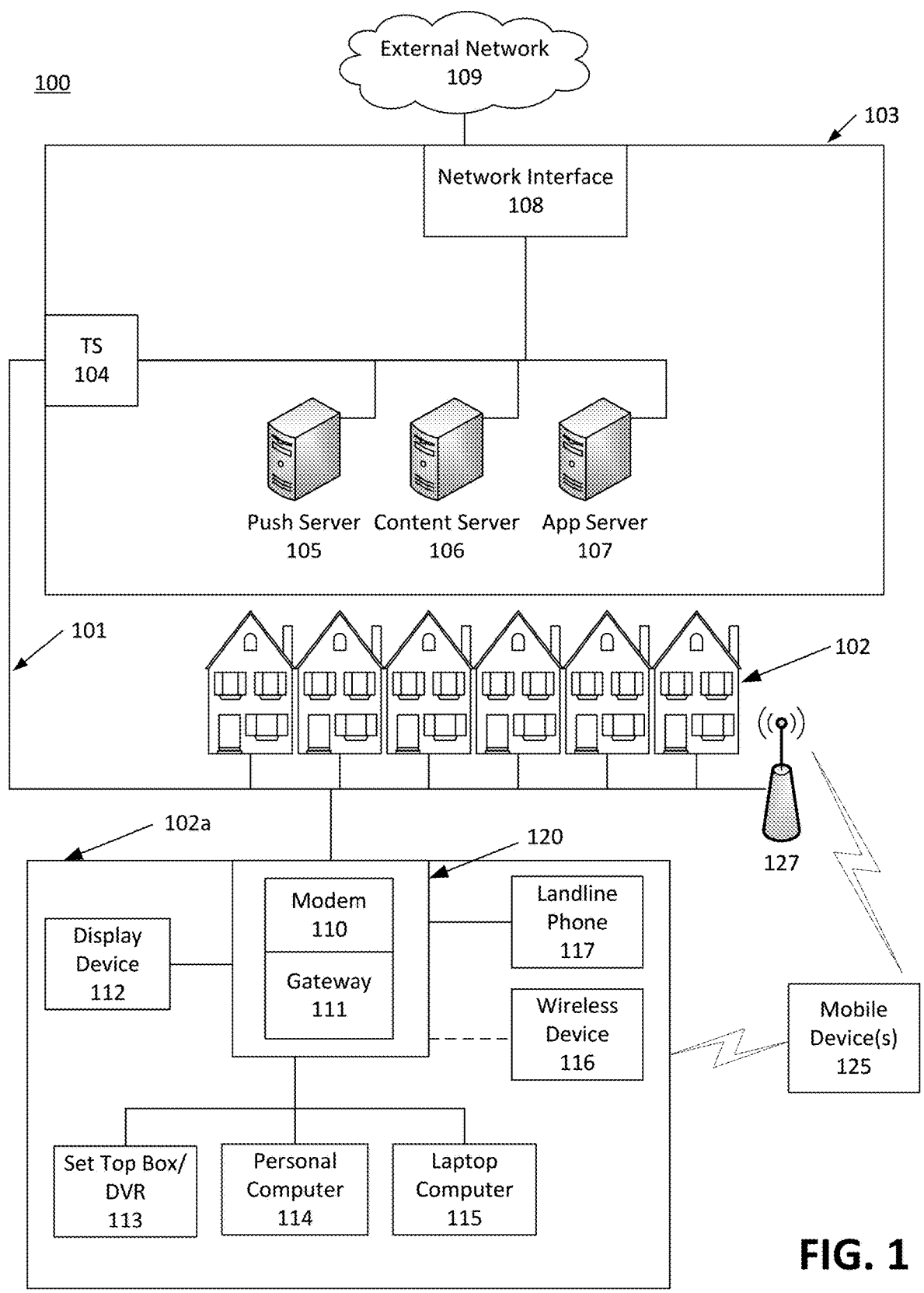
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc., to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS).

The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, and/or other server(s) may be combined. The servers 105, 106, 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
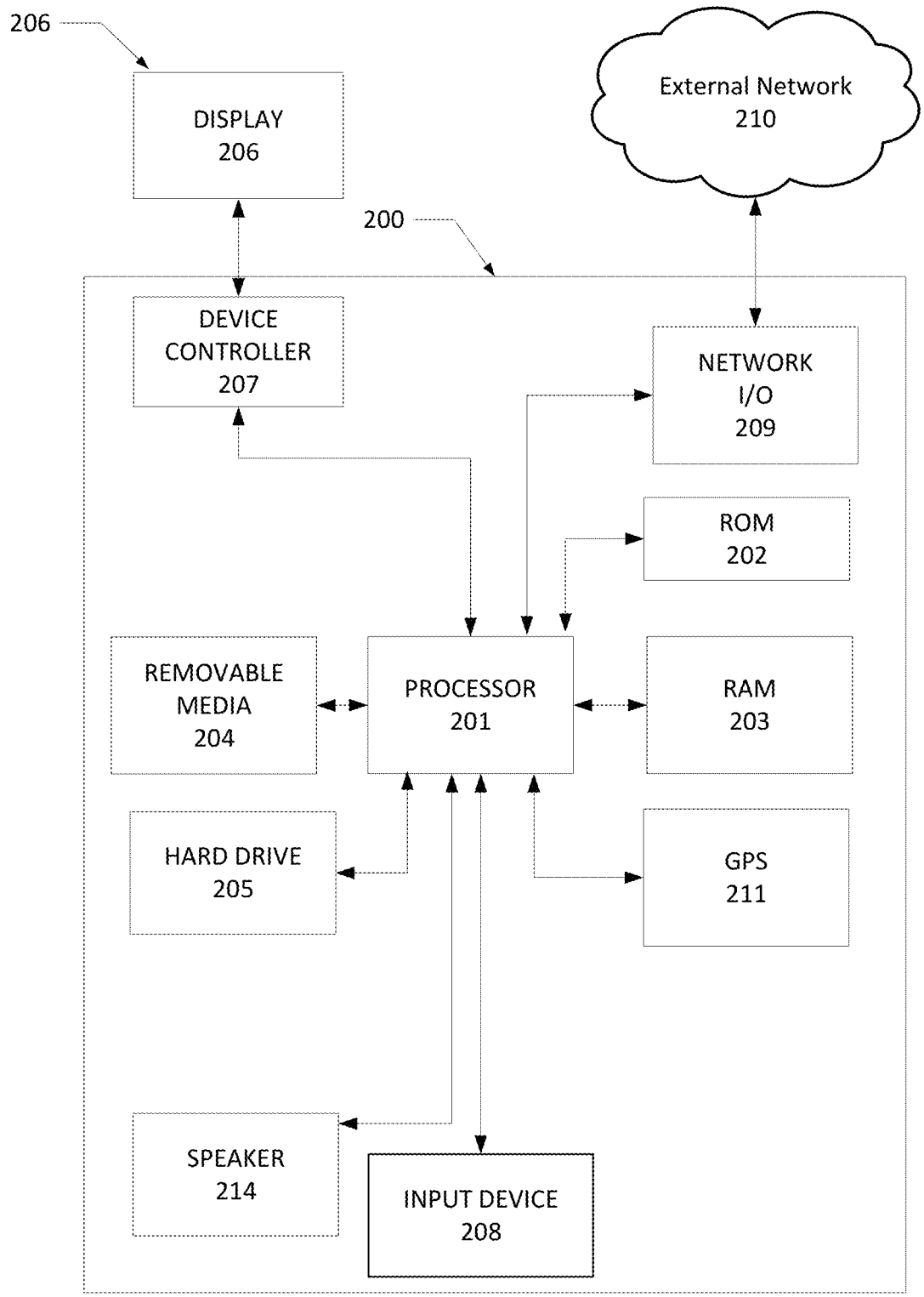
FIG. 2 shows hardware elements of a computing device.

FIG. 2 shows hardware elements of a computing device that may be used to implement any of the computing devices discussed herein. The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
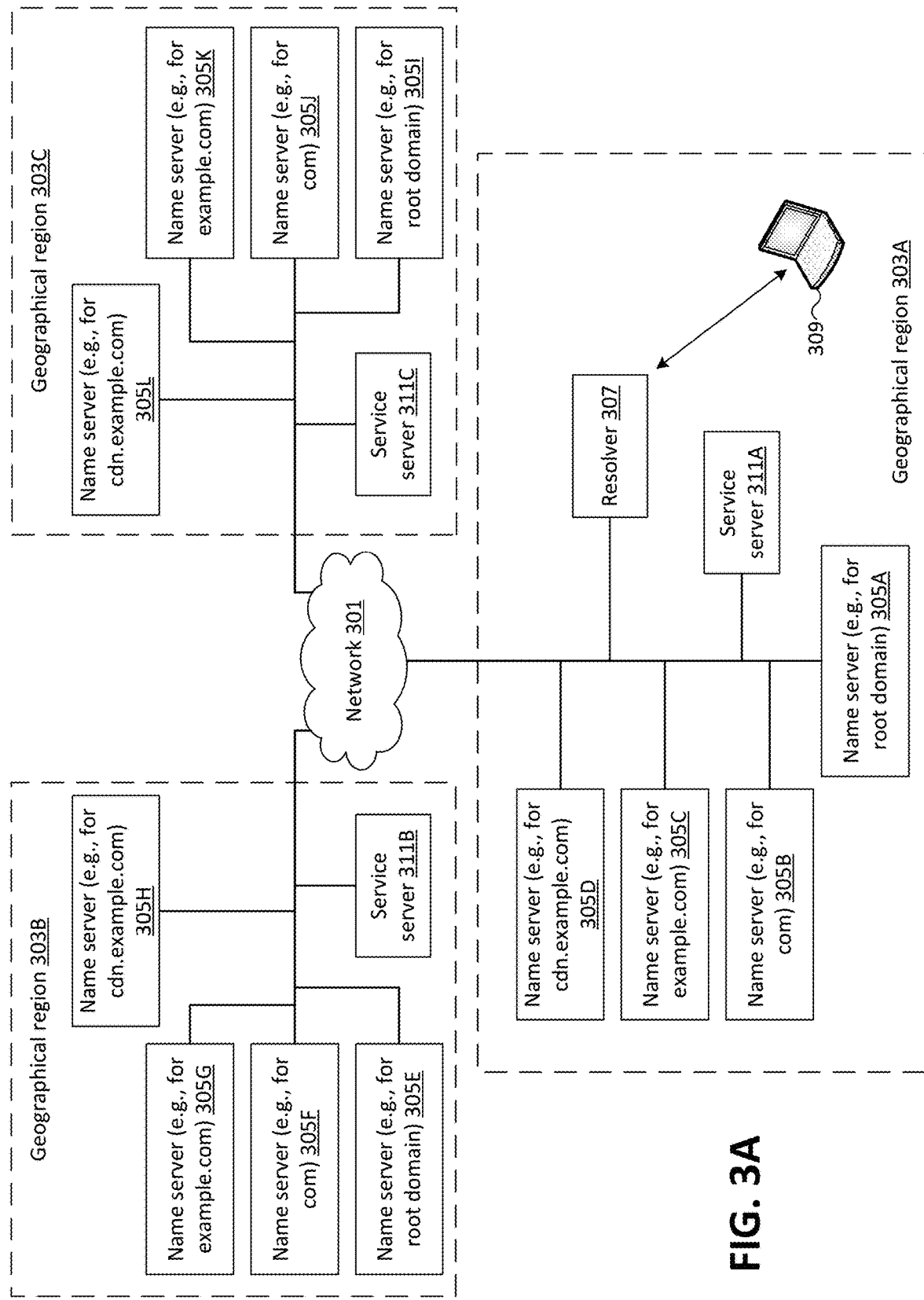
FIG. 3A is a schematic diagram showing an example system in which features discussed herein may be implemented.

FIG. 3A is a schematic diagram showing an example system in which features discussed herein may be implemented. The system may include one or more networks (e.g., network 301), one or more geographical regions (e.g., geographical regions 303A-303C), one or more name servers (e.g., name servers 305A-305L), one or more resolvers (e.g., resolver 307), one or more user devices (e.g., user device 309), and one or more service servers (e.g., service servers 311A-311C).

The one or more name servers, the one or more resolvers, the one or more user devices, and the one or more service servers may be located in the same geographical region or in different geographical regions. For example, the name servers 305A-305D, the resolver 307, the user device 309, and the service server 311A may be located in the geographical region 303A. The name servers 305E-305H and the service server 311B may be located in the geographical region 303B. The name servers 305I-305L and the service server 311C may be located in the geographical region 303C. There may be additional or alternative name servers, resolvers, user devices, and/or service servers in each of the geographical regions 303A-303C. The geographical regions 303A-303C may include any type of geographical region, such as continents, countries, subnational regions, states, provinces, etc. Additionally or alternatively, the geographical regions 303A-303C may include geographical regions demarcated in any desired manners.

The network 301 may be a single network or a collection of multiple connected networks. The network 301 may include one or more of any of various types of information distribution networks, such as a satellite network, a telephone network, a cellular network, a Wi-Fi network, an Ethernet network, an optical fiber network, a coaxial cable network, a hybrid fiber coax network, etc. The network 301 may be a local area network (LAN), a wide area network (WAN), etc. The network 301 may be an Internet Protocol (IP) based network (e.g., the Internet). The network 301 may use a plurality of interconnected communication links to connect the name servers 305A-305L, the resolver 307, the user device 309, and the service servers 311A-311C.

The user device 309 may be, for example, a smartphone, a cell phone, a mobile communication device, a personal computer, a server, a tablet, a desktop computer, a laptop computer, a gaming device, a virtual reality headset, or any other type of computing device. Additionally or alternatively, the user device 309 may be the servers 105-107, the devices 110-117, 125, the computing device 200, or other types of computers or devices.

A service server of the service servers 311A-311C may by any type of computing device. For example, a service server of the service servers 311A-311C may be the push server 105, the content server 106, or the application server 107. A service server of the service servers 311A-311C may be configured to provide various types of services to users, such as web services, email services, Internet telephony services, information retrieval services, video conferencing services, etc.

A service server of the service servers 311A-311C may be associated with an IP address. Other computing devices (such as the user device 309) may use the IP address to access the service server via the network 301 (e.g., the Internet). For example, the user device 309 may put onto the network 301 packets indicating the IP address of the service server as the destination, and indicating requests for a particular service provided by the service server. The network 301 may route the packets to the service server based on the destination IP address in the packets. The service server may receive the packets, and may send the requested service back to the user device 309 in response.

A service server (e.g., the service server 311A) may be associated with a domain name. The domain name may comprise a sequence of characters (e.g., a string including letters, numerals, and/or punctuation marks, such as dots). For example, the domain name associated with the service server may be "service.cdn.example.com." A user may use the domain name to access the service server. The domain name may be mapped or translated into an IP address of the service server, for example, by the domain name system (DNS), and the translated IP address may in turn be used for accessing the service server as discussed above.

Additionally or alternatively, a plurality of service servers (e.g., the service servers 311A-311C) may be associated with the same domain name. For load balancing purposes or other purposes, the plurality of service servers may be configured to provide the same service to users. If a user enters the domain name to access the service, the domain name may be translated into IP address(es) of one or more service servers of the plurality of service servers, and the user's requests for the service may be directed to the one or more service servers of the plurality of service servers. For example, the service servers 311A-311C may be configured to provide web services, and their corresponding domain name may be "service.cdn.example.com." A user may enter the domain name in a web browser running on the user device 309 to access a web page provided by the service servers 311A-311C. The domain name "service.cdn.example.com" may be translated into IP address(es) of one or more service servers of the service servers 311A-311C. And the user device 309 may send, based on the IP address(es), requests for the web page to the one or more service servers.

The translation of domain names to IP addresses may be implemented in various manners. For example, the user device 309 may store mapping information between domain names and IP addresses. If the user device 309 does not store IP address(es) corresponding to a domain name (e.g., entered by a user), the user device 309 may, for example, obtain the IP address(es) corresponding to the domain name using (e.g., by sending one or more requests to) the resolver 307 and/or the name servers 305A-305L.

The resolver 307 may be any type of computing device. From a physical standpoint, the resolver 307 may be implemented as a single device (such as a single server) or as a plurality of devices (such as a plurality of servers). The resolver 307 may be, for example, implemented by Internet Service Providers (ISPs). A name server of the name servers 305A-305L may be any type of computing device. From a physical standpoint, the name server may be implemented as a single device (such as a single server) or as a plurality of devices (such as a plurality of servers). A name server of the name servers 305A-305L may be, for example, implemented according to the DNS protocols.

The resolver 307 may be configured to receive and process requests to resolve domain names (such as requests to determine IP address(es) corresponding to a domain name). For example, the resolver 307 may receive, from the user device 309, a request to resolve the domain name "service.cdn.example.com." The resolver 307 may have a cache storing mapping information between domain names and IP addresses. If the resolver 307 determines that the IP address(es) (e.g., 69.89.31.226, etc.) corresponding to the domain name "service.cdn.example.com" is stored in its cache, the resolver 307 may send the IP address(es) to the user device 309. Otherwise, the resolver 307 may, for example, resolve the domain name using the name servers 305A-305L. The resolver 307 may query the name servers in the domain name hierarchy to determine the IP address(es) corresponding to the domain name.

Figure 3B:
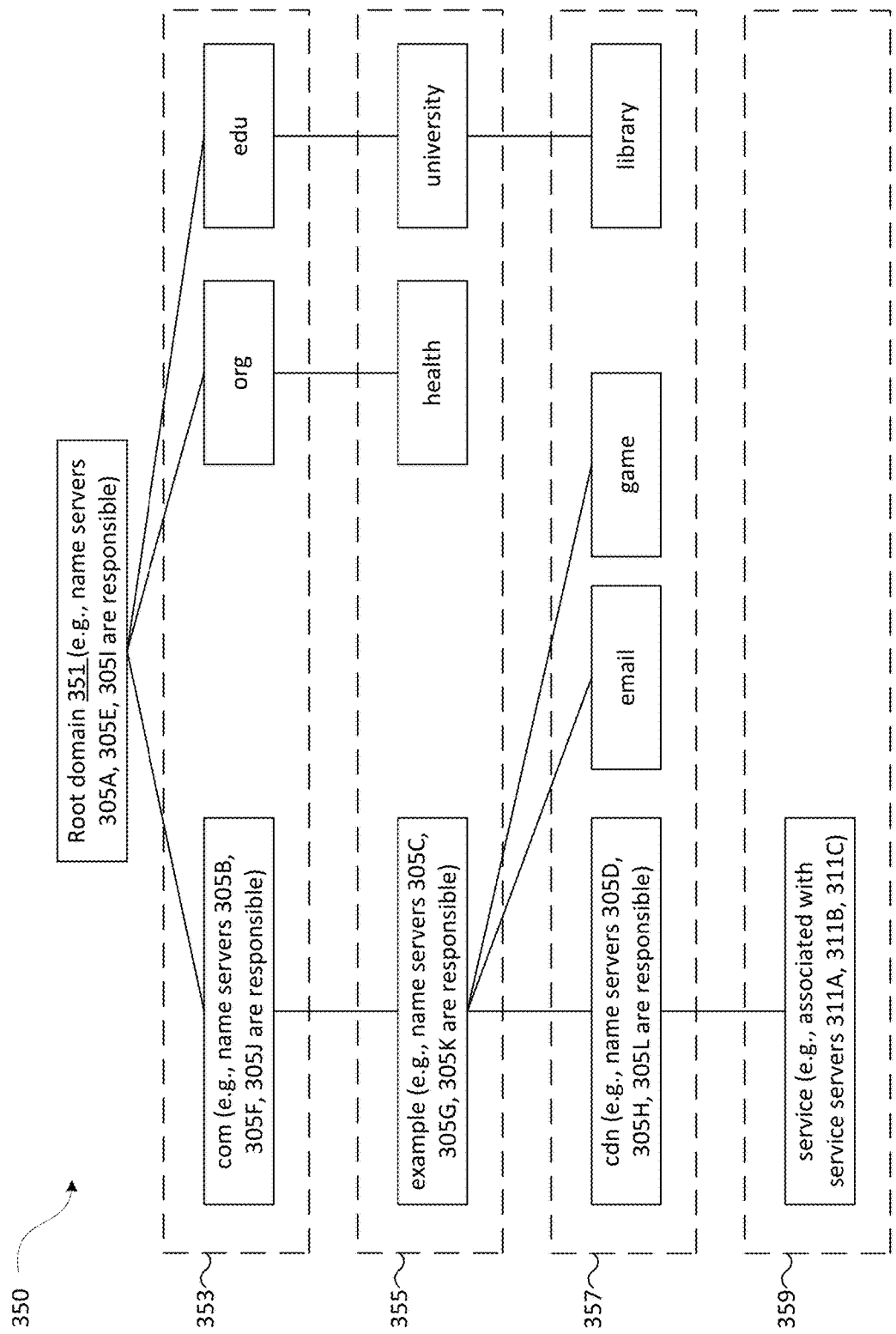
FIG. 3B shows an example of a domain name hierarchy.

FIG. 3B shows an example of a domain name hierarchy 350. The domain name hierarchy 350 may include domains at various levels (such as a root domain level 351, and lower levels 353, 355, 357, 359). The domain name hierarchy 350 may comprise a tree data structure. The root of the tree data structure may be the root domain 351. The root domain 351 may include one or more subdomains, such as "com," "org," "edu," etc., which may also referred to as top-level domains (TLD).

Some domains in the domain name hierarchy 350 may include one or more subdomains. For example, in the domain name hierarchy 350, the top-level domain "com" may include a subdomain "example," which may include a subdomain "email," a subdomain "game," and a subdomain "cdn," which may include a subdomain "service." The top-level domain "org" may include a subdomain "health." The top-level domain "edu" may include a subdomain "university," which may include a subdomain "library." Additionally or alternatively, some domains in the domain name hierarchy 350 might not include any subdomains. For example, in the domain name hierarchy 350, the domains "service," "email," "game," "health," and "library" might not include any subdomains. There may be additional or alternative domains at each level of the domain name hierarchy 350, and there may be additional or alternative domains under each domain in the domain name hierarchy 350.

If a particular domain (e.g., the "example" domain) in the domain name hierarchy 350 includes one or more subdomains (e.g., the "cdn" domain, the "email" domain, and the "game" domain), the responsibility of managing the particular domain (e.g., the "example" domain) may be delegated to a name server. For example, the name server responsible for the "example" domain may store information related to its subdomains "cdn," "email," and "game." If a subdomain (e.g., the "cdn" domain) has its own subdomains (e.g., the "service" domain), the name server responsible for the "example" domain may store mapping information between the subdomain (e.g., the "cdn" domain) and one or more name servers responsible for the subdomain (e.g., the "cdn" domain). If a subdomain (e.g., the "email" domain) does not have its own subdomains, the name server responsible for the "example" domain may store mapping information between the subdomain (e.g., the "email" domain) and IP address(es) of the one or more service servers associated with the subdomain (e.g., the "email" domain).

The following shows an example database table of mapping information stored in a name server responsible for the "example.com" domain. There may be additional or alternative records indicated in the database. A record or entry in the following table may also be referred to as a resource record (RR).

TABLE 1

| Name | Time to live | Type | Resource |
| --- | --- | --- | --- |
| cdn.example.com | 1800 | NS | ns1.cdn.example.com |
| cdn.example.com | 1800 | NS | ns2.cdn.example.com |
| cdn.example.com | 3600 | NS | ns3.cdn.example.com |
| ns1.cdn.example.com | 1800 | A | 192.168.0.1 |
| ns2.cdn.example.com | 1800 | A | 192.168.0.2 |
| ns3.cdn.exmaple.com | 3600 | A | 192.168.0.3 |
| email.example.com | 6000 | A | 192.168.1.1 |
| game.exmaple.com | 1200 | AAAA | 2001:0db8:85a3:0000:0000:8a2e:0370:7334 |

The table may include one or more data fields, such as a name data field, a time to live data field, a type data field, and a resource data field. The table may include additional or alternative data fields (e.g., according to the DNS protocols). The name data field may store a domain name, which may identify a domain. The time to live data field may indicate an amount of time (e.g., 1800 seconds) for which the corresponding record may be cached by a computing device receiving the record (e.g., the resolver 307). The type data field may indicate the type of the resource that the domain name is mapped to (e.g., the type of the resource that is indicated in the resource data field). The type data field may include, for example, type A (indicating that the resource data field may indicate an IPv4 address corresponding to the domain name), type AAAA (indicating that the resource data field may indicate an IPv6 address corresponding to the domain name), type NS (indicating that the resource data field may indicate the hostname of a name server responsible for the domain name), etc.

Using the type NS records in the table above, the name server responsible for the "example.com" domain may delegate its subdomain "cdn.example.com" to name servers "ns1.cdn.example.com," "ns2.cdn.example.com," and "ns3.cdn.example.com," each of which may similarly store mapping information related to the subdomains of "cdn.example.com." The table may also store records indicating the IP addresses of the name servers "ns1.cdn.example.com," "ns2.cdn.example.com," and "ns3.cdn.example.com." These records may be referred to as "glue records," which may allow IP addresses of the name servers for "cdn.example.com" (in addition to the hostnames of the name servers for "cdn.example.com") to be returned to a resolver.

If a resolver (e.g., the resolver 307) receives a request to resolve a domain name (e.g., "service.cdn.example.com"), and does not store the IP address(es) corresponding to the domain name, the resolver may resolve the domain using name servers. For example, the resolver may sequentially query the name servers at each level of the domain name hierarchy to reach the name server(s) that stores the IP address(es) corresponding to the domain name. More details regarding resolving domain names using name servers are discussed in connection with FIG. 4.

As the number of users accessing the Internet services increases, the number of requests sent to resolve domain names may increase. More name servers may be deployed at each level of the domain name hierarchy to facilitate the domain name resolution. The name servers may also be deployed in various geographical regions, such as the United States, Canada, Europe, etc. For example, the name servers 305A, 305E, 305I may be implemented to be responsible for the root domain, the name servers 305B, 305F, 305J may be responsible for the "com" domain, the name servers 305C, 305G, 305K may be implemented to be responsible for the "example.com" domain, and the name servers 305D, 305H, 305L may be implemented to be responsible for the "cdn.example.com" domain. There may be additional or alternative name servers, implemented to be responsible for a particular domain, deployed in the geographical regions 303A-303C and/or other geographical regions.

A user device (e.g., the user device 309) requesting a service may use a resolver (e.g., the resolver 307) local to the user device to resolve the domain name associated with the service, but the local resolver may end up querying a name server located in a geographical region far away from the resolver. For example, the resolver 307 (located in the geographical region 303A) may be directed to query the name servers 305E-305H (located in the geographical region 303B) to resolve the domain name "service.cdn.example.com." This may result in high latency in obtaining IP address(es) corresponding to a domain name.

Localization may be used to alleviate these challenges. The system may localize the resolver, may localize the name servers (e.g., based on the type NS resource records), and may direct the resolver to query name servers local to the resolver during domain name resolution. In this manner, the resolver may avoid querying name servers located far away and having high communication latency. For example, the resolver may traverse the domain name hierarchy associated with a domain name using less time, and may reach the name server that may store the type A or type AAAA resource record(s) associated with the service server using less time. And latency in translating the domain name into service server IP address(es) may be reduced.

Figure 4:
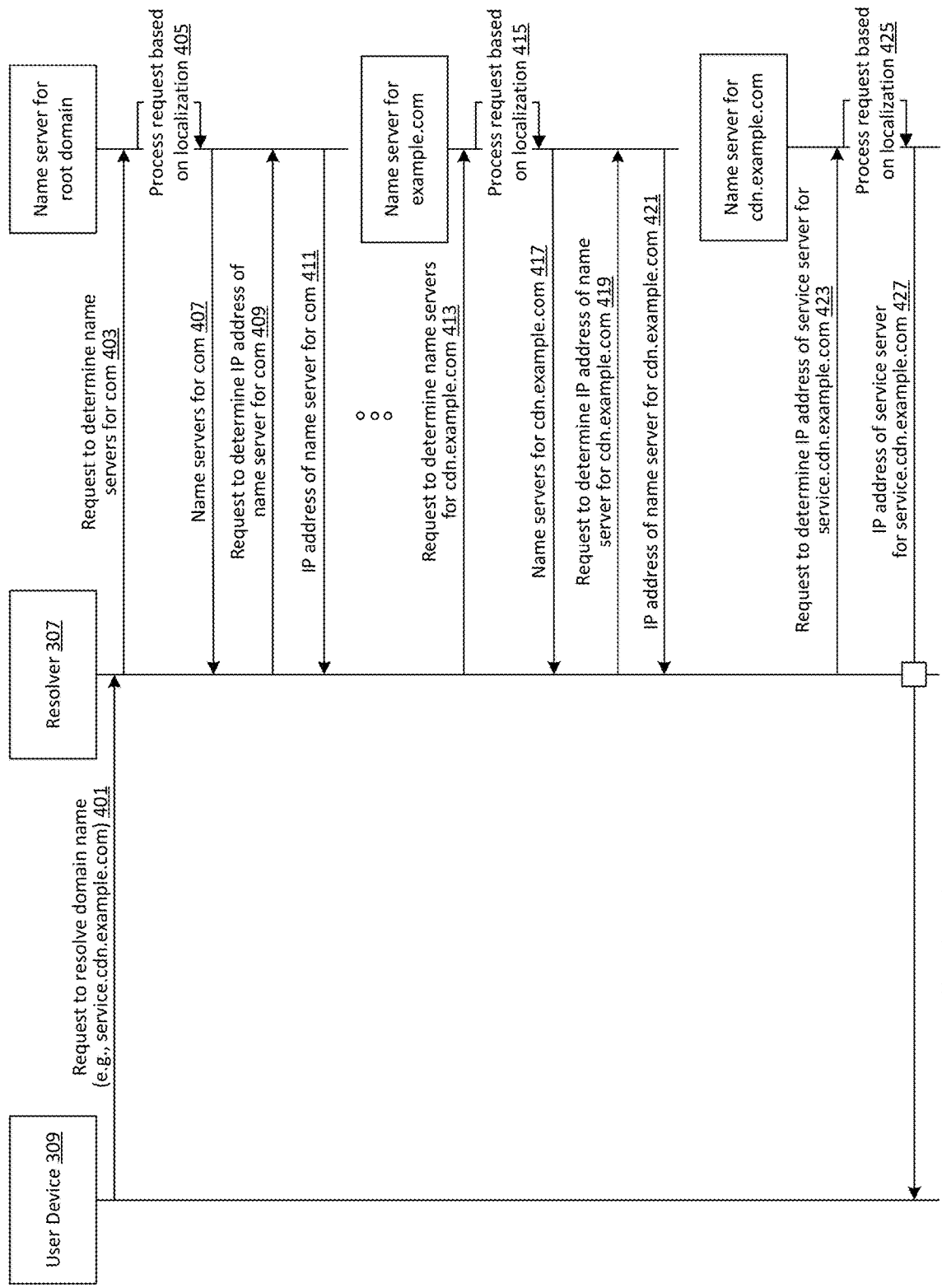
FIG. 4 is an event sequence showing an example method for resolving domain names based on localization.

FIG. 4 is an event sequence showing an example method for resolving domain names based on localization. While the steps of the event sequence are described in a particular order, the order of the steps may be altered without departing from the scope of the disclosure provided herein. Although the event sequence is described as being performed by a particular arrangement of computing systems, devices, and/or networks (e.g., the user device 309, the resolver 307, a name server for the root domain, and/or name servers for various lower level domains), the processes may be performed by a greater or smaller number of computing systems, devices, and/or networks, and/or by any type of computing system, device, and/or network.

In step 401, the user device 309 may send, to the resolver 307, a request to resolve a domain name (e.g., "service.cdn.example.com"). A user may enter, into the user device 309, a request to access services related to the domain name, and the user device 309 may send the request. For example, a user may type "service.cdn.example.com" into a web browser running on the user device 309 to access a web page that streams movies. The web browser and/or the operating system implemented on the user device 309 may determine whether IP address(es) corresponding to the domain name is stored in the user device 309. If the user device 309 determines that IP address(es) corresponding to the domain name is not stored in the user device 309, the user device 309 may send, to the resolver 307, the request to resolve the domain name (e.g., to obtain IP address(es) corresponding to the domain name).

The resolver 307 may receive, from the user device 309, the request to resolve the domain name (e.g., "service.cdn.example.com"), and may process the request. The resolver 307 may determine whether IP address(es) corresponding to the domain name is stored in a cache of the resolver 307. For example, the resolver 307 may determine whether type A record(s) and/or type AAAA record(s) whose name data fields indicate the domain name are stored in the cache of the resolver 307. The resolver 307 may have previously processed other requests to resolve the domain name, may have obtained the IP address(es) corresponding to the domain name, and may have stored the IP address(es) corresponding to the domain name in the cache of the resolver 307. If the resolver 307 determines that it does not store IP address(es) corresponding to the domain name, the resolver 307 may take steps to resolve the domain name on behalf of the user device 309. For example, the resolver 307 may sequentially query the name servers at each level of the domain name hierarchy as discussed below.

In step 403, the resolver 307 may send, to a name server for the root domain, a request to determine name server(s) for the "com" domain. For example, the resolver 307 may send, to the name server for the root domain, a request to obtain the type NS records whose name data fields may indicate "com." The name server for the root domain may receive the request to determine the name server(s) for the "com" domain. In step 405, the name server for the root domain may localize the resolver 307, and may localize name servers for the "com" domain. The name server for the root domain may determine one or more name servers for the "com" domain that are local to (e.g., located within a threshold distance of) the resolver 307. More details regarding the processes performed in step 405 are discussed in connection with FIGS. 5A-C.

In step 407, the name server for the root domain may send, to the resolver 307, a message indicating the one or more name servers for the "com" domain as determined in step 405. The message may indicate the hostnames of the one or more name servers for the "com" domain. For example, the name server for the root domain may respond with one or more type NS records whose name data fields indicate "com."

The resolver 307 may receive the message indicating the one or more name servers for the "com" domain. In step 409, the resolver 307 may send, to the name server for the root domain, a request to obtain the IP address(es) of the name server(s) for the "com" domain. The name server for the root domain may receive the request, and may determine the IP address(es) of the name server(s) for the "com" domain (e.g., based on the glue records stored in the name server for the root domain). In step 411, the name server for the root domain may send, to the resolver 307, a message indicating the IP address(es) of the name server(s) for the "com" domain. For example, the name server for the root domain may send one or more type A records and/or one or more type AAAA records whose name data fields indicate the hostnames of the name servers for the "com" domain. Additionally or alternatively, the IP addresses of the name servers for the "com" domain may be returned in step 407 in addition to or as an alternative of the indications of the hostnames of the name servers for the "com" domain.

If the IP address(es) of the name servers for the "com" domain is obtained, the processes associated with steps 403, 405, 407, 409, 411 may be similarly performed with respect to a lower level in the domain name hierarchy. For example, the resolver 307 may send, to a name server for the "com" domain, a request to determine the name server(s) for the "example.com" domain, in a similar manner as in step 403. The name server for the "com" domain may determine, based on localization, one or more name servers for the "example.com" domain, in a similar manner as in step 405. The name server for the "com" domain may send, to the resolver 307, a message indicating the determined one or more name servers for the "example.com" domain, in a similar manner as in step 407. The resolver 307 may send, to the name server for the "com" domain, a request to obtain IP address(es) of the one or more name servers for the "example.com" domain, in a similar manner as in step 409. The name server for the "com" domain may send, to the resolver 307, a message indicating the IP address(es) of the one or more name servers for the "example.com" domain, in a similar manner as in step 411.

Similarly, in step 413, the resolver 307 may send, to a name server for the "example.com" domain, a request to determine the name server(s) for the "cdn.example.com" domain, in a similar manner as in step 403. In step 415, the name server for the "example.com" domain may determine, based on localization, one or more name servers for the "cdn.example.com" domain, in a similar manner as in step 405. In step 417, the name server for the "example.com" domain may send, to the resolver 307, a message indicating the determined one or more name servers for the "cdn.example.com" domain, in a similar manner as in step 407. In step 419, the resolver 307 may send, to the name server for the "example.com" domain, a request to obtain IP address(es) of the one or more name servers for the "cdn.example.com" domain, in a similar manner as in step 409. In step 421, the name server for the "example.com" domain may send, to the resolver 307, a message indicating the IP address(es) of the one or more name servers for the "cdn.example.com" domain, in a similar manner as in step 411. The resolver 307 may obtain the IP address(es) of the name server(s) for the "cdn.example.com" domain.

In step 423, the resolver 307 may send, to the name server for the "cdn.example.com" domain, a request to obtain the IP address(es) corresponding to the domain name "service.cdn.example.com." The name server for "cdn.example.com" may receive the request. In step 425, the name server for "cdn.example.com" may determine, based on its records, such as type A records or type AAAA records, the IP address(es) corresponding to the domain name (e.g., the IP address(es) of the service servers associated with the domain name "service.cdn.example.com"). Similar to the processes associated with step 405, the name server for "cdn.example.com" may determine, based on localization of the resolver 307 (and/or the user device 309) and the service server(s) associated with the domain name "service.cdn.example.com," one or more service servers that are located close to the resolver 307 (and/or the user device 309). In step 427, the name server for "cdn.example.com" may return the IP address(es) of the determined one or more service servers to the resolver 307. The resolver 307 may forward the received IP address(es) to the user device 309, which may use the IP address(es) for accessing the services associated with the domain name "service.cdn.example.com."

Figure 5A:
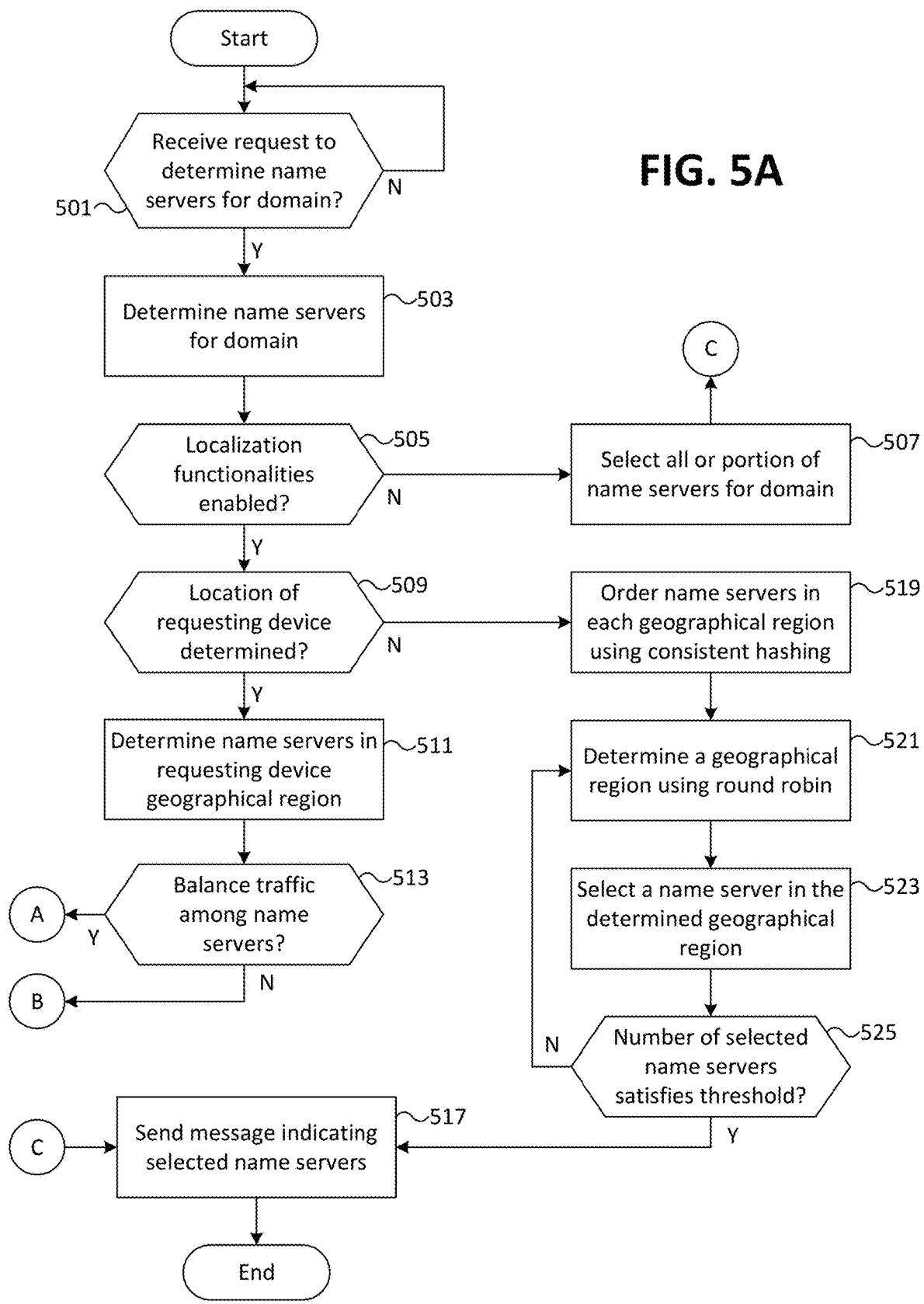
FIGS. 5A-C are a flowchart showing an example method for resolving domain names based on localization.
Figure 5B:
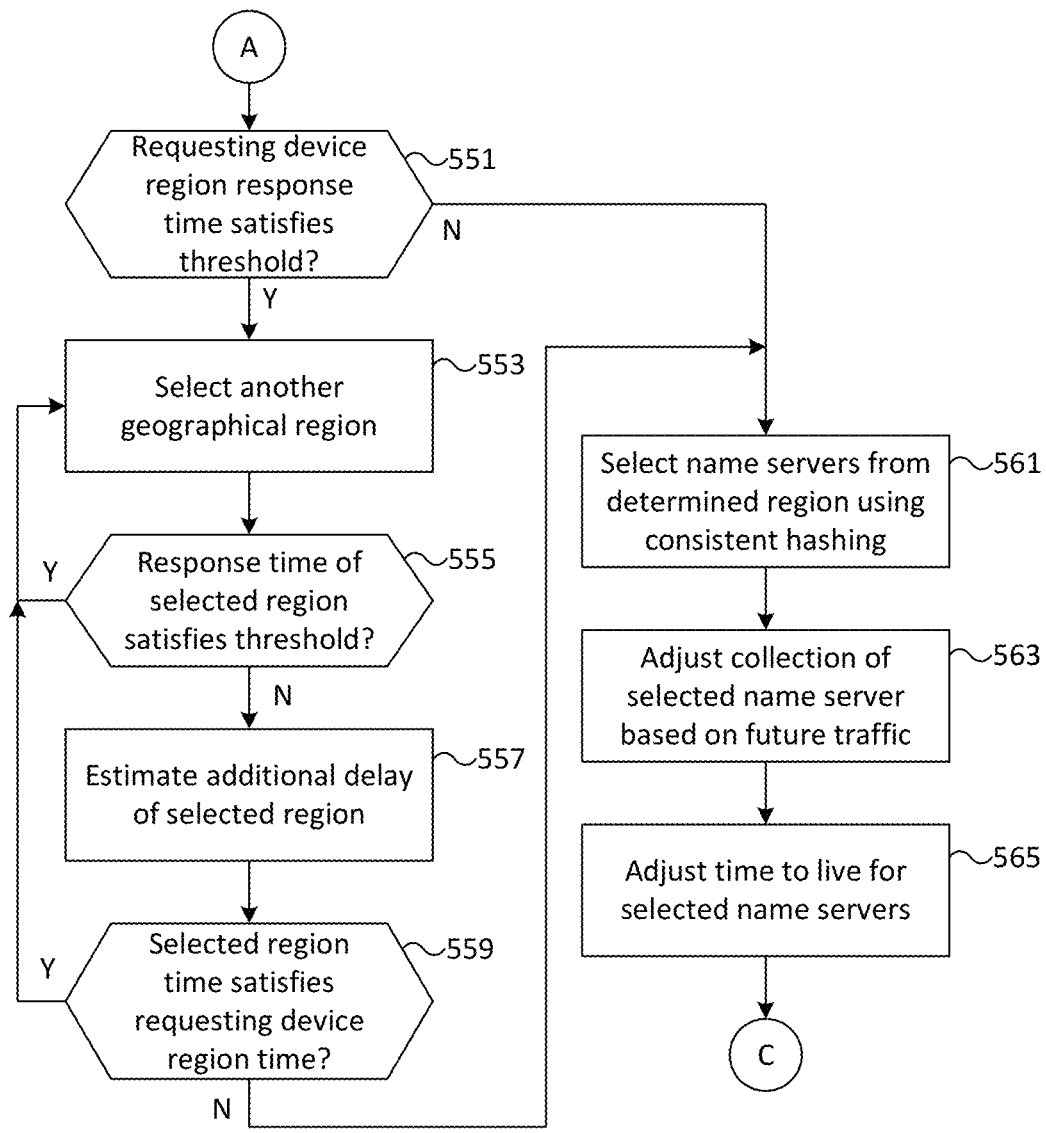
Figure 5C:
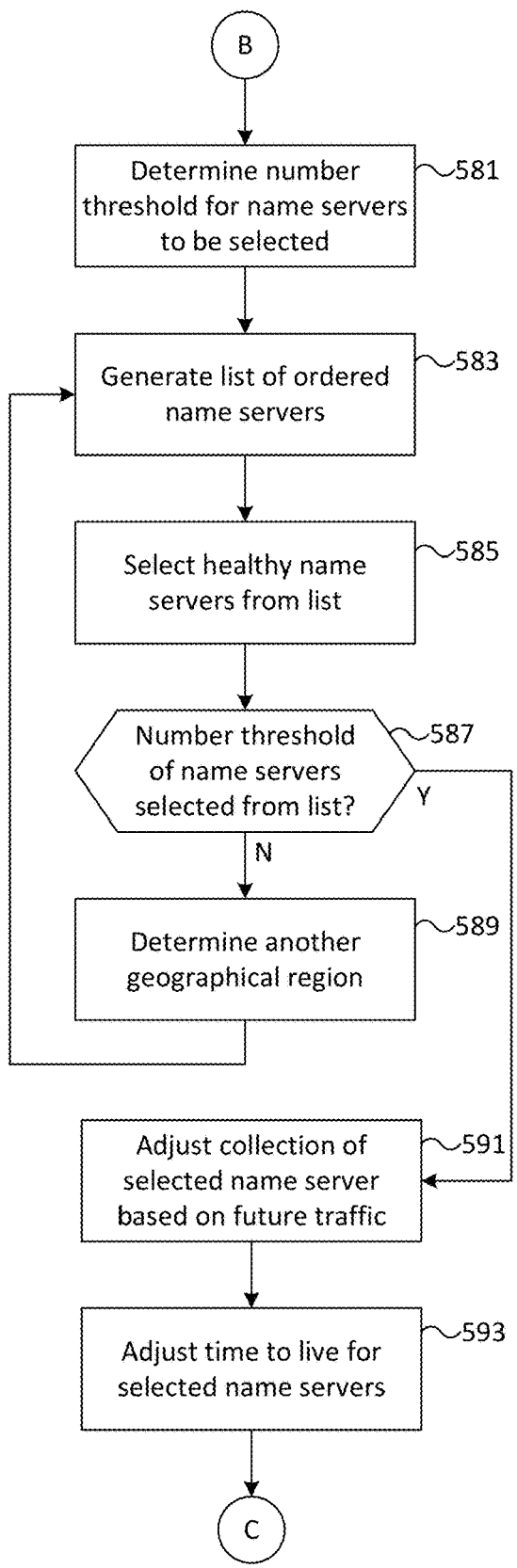

FIGS. 5A-C are a flowchart showing an example method for resolving domain names based on localization. The method may be performed, for example, by the system as discussed in connection with FIG. 3 (e.g., the name servers 305A-305L). The steps of the example method may be described as being performed by particular computing devices (e.g., a first name server, etc.) for the sake of simplicity, but the steps may be performed by any computing device. The steps of the example method may be implemented by name servers at any level of a domain name hierarchy. For example, the processes associated with steps 405, 415 of FIG. 4 may be implemented using the processes discussed below. The steps of the example method are discussed below with respect to determining name servers for a requesting device, but they may be applicable to determining service servers for a requesting device. For example, the processes associated with step 425 of FIG. 4 may be implemented using processes similar to the processes discussed below.

In step 501, it may be determined (e.g., by a first name server responsible for a domain (e.g., the "example.com" domain)) whether a request to determine name servers responsible for a subdomain (e.g., the "cdn.example.com" domain) is received from a requesting device (e.g., a resolver). The request may indicate, for example, a domain name and/or a type of record associated with the domain name. For example, the request may indicate that type NS records associated with the "cdn.example.com" domain are requested. If such a request is not yet received (step 501: N), the first name server may continue listening to its incoming traffic, and may await such a request.

If such a request is received (step 501: Y), the method may proceed to step 503. In step 503, name servers associated with (e.g., responsible for) the domain indicated in the received request may be determined. For example, the first name server may search its database (e.g., a database storing a table such as Table 1) and determine records whose name data fields indicate the domain indicated in the received request (e.g., the "cdn.example.com" domain) and whose type data fields indicate the type indicated in the received request (e.g., type NS). The first name server may determine a group of name servers that are associated with the domain indicated in the received request (e.g., the name servers "ns1.cdn.example.com," "ns2.cdn.example.com," "ns3.cdn.example.com," etc.). The processes (e.g., determining, selecting, ordering, etc.) associated with step 503 (and/or other steps) may be described as being performed on name servers, but the processes may additionally or alternatively be performed on resource records (e.g., type NS resource records associated with the name servers).

In step 505, a determination of whether localization functionalities are enabled with respect to the received request may be made. The localization functionalities may comprise, for example, processes for determining the location of the requesting device, and for determining name servers geographically proximate to the requesting device. For example, the first name server might not always enable its localization functionalities, and instead, may simply provide hostnames and/or IP addresses of name servers regardless of the requesting device's location. For example, for some domain there might be only a single responsible name server, so the location of the requesting device might not matter. An administrator associated with the first name server may set the first name server's localization functionalities to be enabled or disabled. Additionally or alternatively, network conditions may result in the first name server determining not to use the localization functionalities, as will be discussed further below.

The first name server may be configured to enable its localization functionalities with respect to the received request if the quantity of the group of name servers as determined in step 503 satisfies (e.g., meets, exceeds, etc.) a number threshold (e.g., two (2), three (3), four (4), etc.). A determination of whether an average quantity of responsible name servers per domain for the domains managed by the first name server satisfies a number threshold (e.g., three (3)) may also be made. If the average quantity satisfies the number threshold, the first name server may determine to enable its localization functionalities with respect to all or a portion of the requests received by the first name server.

Additionally or alternatively, a determination of whether to enable the localization functionalities with respect to the received request may be made based on the extent to which the group of name servers as determined in step 503 are distributed. If the group of name servers are located far away from each other (e.g., if the group of name servers are distributed among the United States, Germany, Australia, Argentina, and South Korea), directing the requesting device to local name server(s) may save a substantial amount of time in resolving domain names (e.g., helping a requesting device located in the United States avoid querying a name server located in South Korea to resolve a domain name). In such a situation, the first name server may determine to enable its localization functionalities. If the group of name servers are located close to each other (e.g., if the average distance between two name servers of the group of name servers is smaller than a distance threshold, e.g., 1,000 kilometers), directing the requesting device to local name server(s) may save a small amount of time in resolving domain names. In such a situation, the first name server may determine not to enable its localization functionalities.

A database indicating the locations of name servers (e.g., including the locations of the group of name servers as determined in step 503) may be stored (e.g., by the first name server). For example, a new name server may come online, and may register itself with the first name server, providing its own location information. The location information may be stored in a record corresponding to the new name server in the database. The first name server may also be provided with the IP address of the new name server, and may determine the location of the new name server based on the IP address. An administrator may input name server location information into the database. The first name server may continuously or periodically update the database indicating the locations of name servers. For example, the first name server may determine the IP addresses of name servers (e.g., based on the glue records stored in the first name server), and may determine the location of the name servers based on their IP addresses using the method(s) as described in connection with step 509. The location information stored in the database may be used by various processes as described herein.

Based on the location information in the database, an average distance between two name servers of a group of name servers responsible for a particular domain may be determined. If the average distance satisfies (e.g., meets, exceeds, etc.) a distance threshold (e.g., 1,000 kilometers), the first name server may determine to enable its localization functionalities with respect to a request indicating the domain. Otherwise, the first name server may determine not to enable its localization functionalities with respect to a request indicating the domain. Additionally or alternatively, if the group of name servers are located in different geographical regions (e.g., in different continents, countries, etc.), the first name server may determine to enable its localization functionalities with respect to a request indicating the domain. Otherwise, the first name server may determine not to enable its localization functionalities with respect to a request indicating the domain.

A database indicating each domain managed by the first name server and a corresponding flag indicating whether localization functionalities are enabled with respect to requests indicating the domain may be stored (e.g., by the first name server). The first name server may continuously or periodically update the database based on name server location information associated with each domain (e.g., in the background independent of the processing of a received request). If the first name server receives a request indicating a domain, the first name server may query the database to determine the flag corresponding to the indicated domain, and hence may determine whether the localization functionalities are enabled with respect to the request. In this manner, the time used for processing a received request may be reduced.

Additionally or alternatively, a determination of whether to enable the localization functionalities with respect to the received request may be made based on the domain name indicated in the received request. For example, the received request may indicate a domain name (e.g., "abc-vienna-virgina.example.com," "abc-new-york-city.example.com," or "abc-australia.example.com"), which may indicate a geographical location or region (e.g., Vienna, Virginia; New York City; or Australia). The first name server may extract the geographical information from the domain name, and may determine whether to enable the localization functionalities based on the geographical information.

For example, if the area size of the indicated geographical region is smaller than an area size threshold (e.g., 10,000 square kilometers), if the indicated geographical region is below a threshold administrative division level (e.g., the country level, the state level, or the province level), and/or if the indicated geographical region is not a tourist attraction, a metropolitan area, or other types of popular geographical regions, it may be determined that likely name servers responsible for the domain name are clustered in a small region, and requesting devices are likely from the region, and the first name server may determine not to enable the localization functionalities. Otherwise, the first name server may determine to enable the localization functionalities. A database may be stored indicating an area size, administrative division level, popularity, and/or other information corresponding to any geographical region. And the first name server may query the database for these types of information.

The domain name indicated in the received request (e.g., "local-tax-new-york-city.example.com," "tourist-guide-new-york-city.exmaple.com," etc.) may also indicate a type of service (e.g., local tax payment, tourist guide, etc.). The first name server may determine whether to enable the localization functionalities with respect to the received request based on the type of service. If the type of service is related to activities that are likely to happen locally (e.g., paying local tax), and if the domain name also indicate the local geographical region (e.g., New York City) whose area size is below an area size threshold (e.g., 1,000 square kilometers), the first name server may determine to enable the localization functionalities. Otherwise, the first name server may determine not to enable the localization functionalities.

If the localization functionalities are not enabled with respect to the received request (step 505: N), the method may proceed to step 507. In step 507, a selection of all or a portion of the group of name servers as determined in step 503 may be made. For example, the first name server may select, from the group of name servers, one or more healthy name servers (e.g., name servers whose current load is below a load threshold and/or whose time used for responding to a request is below a response time threshold). Additionally or alternatively, the first name server may make the selection randomly. The method may proceed to step 517. In step 517, a message indicating the selected name servers (e.g., the hostnames and/or IP addresses of the selected name servers) and/or the corresponding resource records may be sent to the requesting device.

If the localization functionalities are enabled with respect to the received request (step 505: Y), the method may proceed to step 509. In step 509, processes may be performed (e.g., by the first name server) to determine the location of the requesting device. Location information may be represented in the form of the country, city, and/or zip code of a device, and/or the latitude and longitude of a device. The first name server may store a database indicating device locations, and may query the database to determine the location of the requesting device.

Additionally or alternatively, the first name server may send one or more messages, to third parties that may possess location mapping information, to determine the location of the requesting device. The messages may indicate the IP address of the requesting device, the Media Access Control (MAC) address of the requesting device, and/or other information associated with the requesting device. The third parties may store a mapping between IP addresses (or other information) and locations of the devices associated with the IP addresses. For example, regional Internet registries (e.g., the American Registry for Internet Numbers (ARIN)) may allocate and distribute IP addresses among organizations located in their respective service regions, and may possess such mapping information. Internet Service Providers may also possess such mapping information. If a third party determines, based on the information associated with the requesting device, the location of the requesting device, it may send, to the first name server, a message indicating the location. Otherwise, the third party may send a message indicating that it does not have the location information of the requesting device.

If the location of the requesting device is not stored in the database of the first name server, and/or is not stored by the third parties, the first name server may determine that the location of the requesting device is not successfully determined. Additionally or alternatively, the first name server may determine whether the location of the requesting device is successfully determined based on a timeout. For example, the first name server may determine that the location of the requesting device is not successfully determined if the first name server does not obtain the location information within a time threshold (e.g., 0.5 milliseconds).

The time threshold may be determined based on the extent to which the group of name servers as determined in step 503 are distributed. For example, if the group of name servers are located far away from each other (e.g., if the group of name servers are located in the United States, Germany, Australia, Argentina, and South Korea), directing the requesting device to local name server(s) may potentially save a substantial amount of time in resolving domain names. In such a situation, the time threshold may be set to be longer. If the group of name servers are located close to each other (e.g., if the average distance between two name servers of the group of name servers is smaller than a distance threshold, e.g., 1,000 kilometers), directing the requesting device to local name server(s) may save a small amount of time in resolving domain names. In such a situation, the time threshold may be set to be shorter.

Based on the location information of the group of name servers as determined in step 503, an average distance between two name servers of the group of name servers may be determined. For each name server in the group, a distance between the name server and each other name server in the group may be determined. The average distance may correspond to an average of all of the distances. If the average distance satisfies a distance threshold (e.g., 1,000 kilometers, 2,000 kilometers, etc.), the first name server may increase the time threshold. For example, if the average distance exceeds 1,000 kilometers, the first name server may change the time threshold from 0.25 milliseconds to 0.5 milliseconds. And if the average distance exceeds 2,000 kilometers, the first name server may change the time threshold from 0.5 milliseconds to 1 milliseconds. The determinations may additionally or alternatively be based on a maximum distance between two name servers of the group of name server, or other types of measurements indicating the range or distribution of the group of name servers.

Additionally or alternatively, a linear or non-linear function may be used to map the average distance to the time threshold, such that if the average distance is longer, the time threshold is longer. For example, the following equation may be used to determine the time threshold:

$$T(D) = \begin{cases} 0, & \text{if } D < D_0 \\ K*(D-D_0)+T_0, & \text{if } D \geq D_0 \end{cases} \quad (1)$$

In the equation, D may represent the average distance between two name servers of a group of name servers responsible for a domain, T(D) may represent the time threshold associated with the domain, K may represent the coefficient, and $D_0$ and $T_0$ may represent constant numbers. For example, K may be 0.0005 milliseconds per kilometer, $D_0$ may be 100 kilometers, and $T_0$ may be 0.1 milliseconds. The values of K, $D_0$, and $T_0$ may be other numbers, and/or may be adjusted in any desired manners.

Additionally or alternatively, the first name server may determine the geographical regions in which the group of name servers as determined in step 503 are located, and may increase the time threshold if the group of name servers are located in different geographical regions. The first name server may set the time threshold to be longer if the quantity of the determined geographical regions is larger. The geographical regions may be demarcated in any desired manners. For example, if all of the group of name servers are located in Northeastern United States, the first name servers may set the time threshold to be 0.1 milliseconds. If the group of name servers are located in Northeastern United States, Southern United States, and Midwestern United States, the first name servers may set the time threshold to be 0.3 milliseconds.

A database indicating a time threshold corresponding to each domain managed by the first name server may be stored (e.g., by the first name server). The time threshold may be determined based on the extent to which the group of name servers responsible for the corresponding domain are distributed, using the method(s) as discussed above. The database may be continuously or periodically updated (e.g., in a background computing process). If the first name server receives, from a device, a request indicating a domain to be resolved, the first name server may query the database to determine, based on the indicated domain, the time threshold for determining the location of the device.

Additionally or alternatively, the requesting device may be configured to include its location information in the request sent to the first name server. For example, the requesting device may determine its location based on the requesting device's geolocation functionalities, such as the Global Positioning System (GPS), and may include in the request a data field that indicates the location of the requesting device. In such a case, the first name server may extract, from the request, the location information of the requesting device, and may determine the location of the requesting device.

If the location information of the requesting device is obtained (step 509: Y), the method may proceed to step 511. In step 511, the first name server may determine, from the group of name servers responsible for the domain indicated in the received request as determined in step 503, one or more name servers that are located in the same geographical region as the requesting device. Additionally or alternatively, the first name server may determine, from the group of name servers as determined in step 503, one or more name servers that are located within a distance threshold (e.g., 5 kilometers) to the requesting device, for example, based on the latitudes and longitudes of the requesting device and/or the name servers. The first name server may determine a set of name servers including the determined one or more name servers.

In step 513, a determination of using which processes to select name servers to be indicated in a message to be sent to the requesting device may be made. The first name server may balance traffic from various requesting devices among name servers in a geographical region. Additionally or alternatively, the first name server may group the traffic to a portion of the name servers. Based on the different operation modes, the processes for selecting name servers for a request received from a particular requesting device may be different. The first name server may determine the processes to use in various manners. For example, an administrator may set the processes to be used by the first name server. Additionally or alternatively, the first name server may make the determination based on its memory consumption. As discussed below, balancing the traffic among name servers in a region may include determining an individualized collection of name servers for a particular requesting device, which may contribute to causing more memory consumption. If the first name server determines, for example, that its average memory consumption satisfies a memory consumption threshold (e.g., 70% of its total memory size) over a period of time, the first name server may determine to use the processes associated with grouping traffic.

If it is determined to balance traffic from requesting devices among name servers in a geographical region (step 513: Y), the method may proceed to step 551. Referring to FIG. 5B, in step 551, a determination of whether a regional response time associated with the geographical region of the set of the name servers as determined in step 511 satisfies (e.g., meets or exceeds) a first response time threshold (e.g., 2 milliseconds) may be made. The response time of a name server may, for example, correspond to a time period between receiving a request and sending a response of the request. The response time of a name server may be based on the load of the name server. For example, if the current load of a name server is higher, the name server may need more time to complete processing of a particular request, and the response time may be correspondingly higher. A name server of the set of name servers as determined in step 511 may monitor its own response time, and may continuously or periodically report its response time (e.g., to the first name server). The regional response time may, for example, correspond to an average of the current response times of the set of name servers.

If the regional response time does not satisfy the first response time threshold (step 551: N), the method may proceed to step 561. In step 561, the first name server may select, from the set of name servers as determined in step 511, one or more name servers, for example, using a consistent hashing algorithm, so that the traffic from various requesting devices may be balanced among the set of name servers. The first name server may perform a hash function on each of the resource records associated with the set of name servers (e.g., the type NS resource records whose resource data fields indicate the set of name servers) and/or on a portion of each resource record, such as the resource data field portion. By performing the hash function, the first name server may generate a hash value associated with each name server of the set of name servers. The first name server may order the set of name servers based on their respective hash values (e.g., from small hash values to large hash values), to generate a list of ordered name servers.

The first name server may perform a hash function on information related to the requesting device (e.g., the IP address of the requesting device) to generate a hash value associated with the requesting device. The first name server may place the requesting device in the list of ordered name servers based on the hash value associated with the requesting device. For example, the first name server may order the requesting device together with the name servers based on their respective hash values (e.g., from small hash values to large hash values). The requesting device may be placed between two consecutive name servers where the hash value associated with one name server is larger than the hash value associated with the requesting device and where the hash value associated with the other name server is smaller than the hash value associated with the requesting device. From the requesting device in the list and in one particular direction, the first name server may keep selecting the next name server in the list, until the first name server selects a predetermined number (e.g., five (5)) of name servers. If the end of the list is reached, the selection may resume from the beginning of the list (e.g., as if selecting from a circular list of name servers).

Various requesting devices of the first name server may be associated with same or different hash values, and may be directed to same or different subsets of the set of name servers as determined in step 511. Additionally, the same input to a consistent hashing algorithm may produce the same output over multiple hash values, and if the requesting device subsequently sends, to the first name server, a request indicating the domain, the requesting device may be mapped to the same one or more name servers responsible for the domain as those determined for the currently received request. Name servers at the same level of the domain name hierarchy as the first name server (e.g., other name servers responsible for the "example.com" domain) may be configured to perform the same consistent hashing algorithm as the first name server, so that traffic from the requesting device may be predictably directed to the same subset of the set of name servers.

If the regional response time satisfies (e.g., meets, exceeds, etc.) the first response time threshold (step 551: Y), the method may proceed to step 553. Additionally or alternatively, if the set of name servers as determined in step 511 is empty, the method may proceed to step 553. In step 553, a selection of another geographical region may be made based on proximity to the requesting device (and/or to the geographical region in which the requesting device is located). A distance between each geographical region (e.g., of the geographical regions 303A-303C) and the requesting device may be calculated. The distance may correspond to a distance between a point in the geographical region (e.g., its geometric center) and the requesting device. The geographical regions may be ranked based on their respective distances to the requesting device (e.g., from small distances to large distances). The first name server may select a top ranked geographical region that has not been selected for the received request (e.g., the closest geographical region to the requesting device), and the method may proceed to step 555.

In step 555, a determination of whether a regional response time of the selected geographical region satisfies (e.g., meets, exceeds, etc.) a second response time threshold may be made. This determination may be made in a similar manner as in step 551. The regional response time of the selected geographical region may, for example, correspond to an average of the current response times of a set of name servers that are responsible for the domain indicated in the received request and that are located in the selected geographical region. The second response time threshold may be same as or different from the first response time threshold. For example, the second response time threshold (e.g., 1.5 milliseconds) may be shorter than the first response time threshold (e.g., 2 milliseconds), so that the first name server may consider other factors that may contribute to the latency associated with the selected geographical region (such as the selected geographical region's distance to the requesting device).

If the regional response time of the selected geographical region satisfies the second response time threshold (step 555: Y), the method may go back to step 553. Additionally or alternatively, if the selected geographical region does not include any name servers that are responsible for the domain indicated in the received request, the method may go back to step 553. In step 553, another geographical region (e.g., a geographical region ranked, based on proximity, next to the selected geographical region) may be selected.

If the regional response time of the selected geographical region does not satisfy the second response time threshold (step 555: N), the method may proceed to steps 557, 559, in which delay in obtaining a response from the selected geographical region caused by its distance to the requesting device may be considered. Steps 557, 559, as with all steps, are optional and might not be performed. In such a case, the method may proceed to step 561 if the regional response time of the selected geographical region does not satisfy the second response time threshold (step 555: N).

In step 557, the additional delay in obtaining a response from the selected geographical region caused by its distance to the requesting device may be estimated. A first time length used for routing a packet from the requesting device to a server in the geographical region in which the requesting device is located and/or for routing a packet from the server to the requesting device may be determined. A second time length used for routing a packet from the requesting device to a server in the selected geographical region and/or for routing a packet from the server to the requesting device may be determined. The additional delay may correspond to the second time length minus the first time length.

A time length used for routing a packet from a source to a destination may be determined in various manners. The time length may be determined based on the distance between the source and the destination. For example, an average network latency per kilometer may be determined (e.g., 5 microseconds per kilometer), and the time length may correspond to the average network latency per kilometer multiplied by the distance. The time length may be adjusted based on current network conditions (e.g., the quantity of routers or switches that the packet may pass through, the amount of traffic in the network, etc.). Additionally or alternatively, computing devices may be set up in a source geographical region and in a destination geographical region, may send messages to each other, and determine the time used for delivering the messages sent. The time information may be reported (e.g., to the first name server).

In step 559, a determination of whether the name servers in the selected geographical region have better conditions to handle requests than the name servers in the geographical region in which the requesting device is located may be made. For example, the first name server may determine whether the combination of the regional response time of the selected geographical region and the additional delay satisfies (e.g., meets, exceeds, etc.) the regional response time of the geographical region in which the requesting device is located. If so (step 559: Y), the method may go back to step 553, in which another geographical region may be selected. Otherwise (step 559: N), the method may proceed to step 561. In step 561, the first name server may select, using a consistent hashing algorithm, one or more name servers from the selected geographical region in a similar manner as discussed above with respect to selecting, using a consistent hashing algorithm, name servers from the geographical region in which the requesting device is located.

In step 563, the collection of name servers as selected in step 561 may be adjusted based on estimating future traffic to the name servers responsible for the indicated domain. For example, the amount of traffic to each of the name servers responsible for the indicated domain at any particular time may be recorded. Based on the recorded data, traffic patterns may be determined. For example, there may be a determination that the amount of traffic to the name servers that are located in the same region as the requesting device may reach a peak amount at 2 AM every Monday, and may decrease to a base amount at 3 AM on the same day.

If the name servers located in the geographical region of the requesting device do not have enough capacity to handle the peak traffic load, directing the peak traffic load to the name servers may contribute to causing an average of the name servers' response times to exceed a response time threshold. If it is determined that the name servers do not have enough capacity, the first name server may include additional name servers to the collection of name servers as selected in step 561 in advance of (e.g., one (1) hour before) the predicted peak traffic time. The additional name servers may be chosen from one or more geographical regions that are the closest to the requesting device and that do not have peak traffic loads exceeding their capacities during the predicted peak traffic time associated with the requesting device's geographical region.

An extra amount of traffic to be directed to the one or more closest geographical regions may be determined, for example, to correspond to the peak traffic amount (e.g., 10 million transactions per second) minus the capacity of the name servers located in the geographical region of the requesting device (e.g., 8 million transactions per second). The quantity of additional name servers to be chosen may be based on the extra amount of traffic. For example, the quantity of additional name servers may be larger if the extra amount of traffic is larger. Additionally or alternatively, the quantity of additional name servers may correspond to the extra amount of traffic multiplied by the quantity of name servers selected from the geographical region of the requesting device divided by the capacity of the name servers located in the geographical region of the requesting device. The quantity of additional name servers to be chosen from each of the one or more closest geographical regions (e.g., using a consistent hashing algorithm) may be proportional to their extra capacity during the peak traffic of the geographical region of the requesting device.

In step 565, the time to live data field for the collection of name servers may be adjusted. For example, if one or more name servers of the collection of name servers are from a geographical region other than the geographical region of the requesting device, the first name server may set the time to live data field of the resource records corresponding to the one or more name servers to be different from (e.g., shorter than) name servers from the geographical region of the requesting device. The time to live data field associated with the one or more name servers may correspond to a time duration that may cover the peak traffic load of the geographical region of the requesting device. For example, if the peak traffic load happens from 2 AM to 3 AM, and if the processes described herein happens at 1 AM, the time to live data field associated with the one or more name servers may be set to be 7200 seconds (e.g., covering 1 AM to 3 AM).

If, in step 513, it is determined to group traffic to a portion of name servers in a geographical region (step 513: N), the method may proceed to step 581. In step 581, a number threshold for name servers to be selected may be determined. The number threshold may be determined based on current network conditions. For example, if the amount of traffic (e.g., transactions per second) to the set of name servers as determined in step 511 satisfies (e.g., meets, exceeds, etc.) a traffic amount threshold, the first name server may increase the number threshold (e.g., from 6 to 8). With the increased number threshold, more name servers may be selected for handling requests from requesting devices, and the name servers individually may be less likely to become overloaded.

In step 583, the set of name servers as determined in step 511 may be ordered, and a list of ordered name servers may be generated. The first name server may use a consistent hashing algorithm to order the set of name servers. The first name server may perform a hash function on information associated with the set of name servers to generate hash values associated with the set of name servers. The first name server may perform a hash function on a constant value, such as the domain name (as indicated in the received request) or a portion of the domain name, to generate a second hash value. The first name server may order the set of name servers based on their respective hash values (e.g., from small values to large values). The second hash value may be placed between two consecutive name servers where the hash value associated with one name server is larger than the second hash value and where the hash value associated with the other name server is smaller than the second hash value.

The starting point for selecting from the list of ordered name servers may be the position where the second hash value may be placed in the list. And if during selecting the end of the list is reached, the selecting may resume from the beginning of the list (as if selecting from a circular list). Using a constant value (e.g., the domain name), instead of a variable value (e.g., information specific to a particular received request and/or requesting device), as input to the hash function in determining the second hash value may help reduce the amount of memory used for the processes. The list and/or the starting point for selecting may be stored, and the stored list and/or starting point for selecting may be retrieved for processing additional requests. For example, if the first name server receives another request indicating the domain name, the first name server may retrieve, for processing the request, the stored list and/or the stored starting point for selecting, and might not need to generate again the list and/or the starting point for selecting (e.g., by calculating the hash values). Name servers at the same level of the domain name hierarchy as the first name server may be configured to perform the same consistent hashing algorithm as the first name server, so that the name servers may generate the same list of ordered name servers, and traffic from requesting devices may be potentially directed to the same subset of the set of name servers. Additionally or alternatively, the first name server may use any other desired algorithm to generate the list.

In step 585, healthy name servers may be selected from the starting point of the list of ordered name servers and in one particular direction of the list. If the end of the list is reached, the selection may resume from the top of the list (e.g., as if selecting from a circular list of name servers). The healthiness of a name server may be indicated by various factors, such as the name server's response time, current load, etc. For example, if the response time of a name server in the list is below a response time threshold (e.g., 2 milliseconds), the first name server may determine that name server is healthy and may select the name server. The first name server may keep selecting healthy name servers from the list, until the selected name servers has reached the number threshold as determined in step 581 or the list has been exhausted. In step 587, a determination may be made of whether the number threshold of name servers has been selected from the list. If not (step 587: N), the method may proceed to step 589. Additionally or alternatively, if the current geographical region from which healthy name servers are selected does not include any name servers responsible for the indicated domain, the method may proceed to step 589.

In step 589, there may be a determination of another geographical region (e.g., based on proximity), from which name servers may further be selected. For example, the first name server may determine a distance between each geographical region (e.g., of the geographical regions 303A-303C) and the requesting device, and may select a geographical region with the smallest distance value (that has not been selected for the received request). The method may go back to step 583, in which the first name server may generate a list of ordered name servers that are responsible for the indicated domain for the selected geographical region. In this manner, the first name server may keep selecting healthy name servers from one or more geographical regions, in order to reach the number threshold.

If the number threshold of name servers has been selected (step 587: Y), the method may proceed to step 591. In step 591, the collection of selected name servers may be adjusted based on estimating future traffic to the name servers responsible for the indicated domain. For example, the amount of traffic to each of the name servers responsible for the indicated domain at any particular time may be recorded. Based on the recorded data, traffic patterns may be determined. For example, there may be a determination that the amount of traffic to the name servers that are located in the same region as the requesting device may reach a peak amount at 2 AM every Monday, and may decrease to a base amount at 3 AM on the same day.

If the name servers located in the geographical region of the requesting device do not have enough capacity to handle the peak traffic load (e.g., if an average of the name servers' response time may exceed a response time threshold if the peak traffic load is directed to the name servers), the first name server may include additional name servers to the collection of selected name servers in advance of (e.g., one (1) hour before) the predicted peak traffic time. The additional name servers may be chosen from one or more geographical regions that are the closest to the requesting device and that do not have peak traffic loads exceeding their capacities during the predicted peak traffic time associated with the requesting device's geographical region. The additional name servers may be chosen from each of the one or more geographical regions in a similar manner as in steps 583, 585 (e.g., selecting the healthy name servers from a region).

In step 593, the time to live data field for the collection of name servers may be adjusted. For example, if one or more name servers of the collection of name servers are from a geographical region other than the geographical region of the requesting device, the first name server may set the time to live data field of the resource records corresponding to the one or more name servers to be different from (e.g., shorter than) name servers from the geographical region of the requesting device. The time to live data field associated with the one or more name servers may correspond to a time duration that may cover the peak traffic load of the geographical region of the requesting device. For example, if the peak traffic load happens from 2 AM to 3 AM, and if the processes described herein happens at 1 AM, the time to live data field associated with the one or more name servers may be set to be 7200 seconds (e.g., covering 1 AM to 3 AM).

In step 517, a message indicating the selected name servers (e.g., selected in the processes associated with steps 507, 561, 563, 585, 591) may be sent to the requesting device. For example, the first name server may send, to the requesting device, the type NS records whose name data fields indicate the selected name servers (with their time to live data fields optionally adjusted as discussed above). Additionally or alternatively, the first name server may send, to the requesting device, a message indicating the IP addresses of the selected name servers and/or the type A and/or type AAAA records associated with the selected name servers (e.g., if the receive request inquired for the IP addresses of name servers).

If the location information of the requesting device is not obtained (step 509: N), the method may proceed to step 519. The first name server may select, from the group of name servers responsible for the domain indicated in the received request as determined in step 503, one or more name servers to be included in a message to be sent to the requesting device. The first name server may make this selection in various manners (e.g., in order to evenly distribute traffic among the group of name severs). For example, the first name server may make the selection using a round robin algorithm and a consistent hashing algorithm.

In step 519, the geographical regions in which the group of name servers are located may be determined, and the name servers located in each of the geographical regions may be ordered using a consistent hashing algorithm (e.g., in a similar manner as in step 561). For example, for each of the name servers located in a particular geographical region, the first name server may generate a hash value based on hashing all or a portion of the type NS resource record associated with the name server. The first name server may order the name servers located in the particular region based on their hash values, to generate a list of ordered name servers for the particular geographical region. The first name server may generate such a list for each of the geographical regions in which the group of name servers are located.

A second hash value may be generated by hashing information associated with the requesting device (e.g., the IP address of the requesting device) or by hashing a constant value (e.g., the domain name indicated in the received request). For a list of ordered name servers, the second hash value may be placed between two consecutive name servers where the hash value associated with one name server is larger than the second hash value and where the hash value associated with the other name server is smaller than the second hash value. The starting point for selecting from a list of ordered name servers may be the position where the second hash value may be placed in the list.

In step 521, the first name server may determine a geographical region, of the geographical regions in which the group of name servers are located, from which a name server may be selected. For example, the geographical region may be determined randomly. In step 523, the first name server may select, from the starting point of the list of ordered name servers associated with the determined geographical region and in one particular direction of the list, a name server (e.g., a name server whose hash value is the next largest (or smallest) compared to the second hash value). If the end of the list is reached, the selection may resume from the top of the list (e.g., as if selecting from a circular list of name servers).

In step 525, a determination of whether a predetermined number (e.g., five (5)) of name servers have been selected may be made. If the predetermined number of name servers have not been selected (step 525: N), the method may go back to step 521. In step 521, a next geographical region, of the geographical regions in which the group of name servers are located, may be determined using a round robin algorithm. In step 523, the first name server may select, from the list of ordered name servers associated with the determined geographical region, a name server using the consistent hashing algorithm in a similar manner as discussed above. In this manner, the first name server may sequentially select one name server from each of the geographical regions until the predetermined number of name servers have been selected. If the predetermined number of name servers have not been selected, the first name server may sequentially select another name server from each of the geographical regions until the predetermined number of name servers have been selected, and so on and so forth.

For example, the name servers responsible for the domain indicated in the received request may be located in the United States, Germany, Argentina, and South Korea: three (3) name servers in the United States, four (4) name servers in Germany, three (3) name servers in Argentina, and five (5) name servers in South Korea. Using the round robin algorithm, the first name server may sequentially select a name server from the United States, Germany, Argentina, and South Korea. When selecting from a particular region, the first name server may use the consistent hashing algorithm discussed above. If the predetermined number of name servers to be selected is six (6), the first name server may first select one name server from the United States, and then one name server from Germany, and then one name server from Argentina, and then one name server from South Korea, and then one name server from the United States, and then one name server from Germany.

If the predetermined number of name servers have been selected (step 525: Y), the method may proceed to step 517. In step 517, a message indicating the selected name servers (e.g., the hostnames and/or IP addresses of the selected name servers) and/or the corresponding resource records may be sent to the requesting device.

Additionally or alternatively, if the first name server determines the location of the requesting device, the first name server may order the name servers responsible for the domain indicated in the received request based on the name servers' distances to the requesting device and/or the name servers' response time. For example, a name server's distance to the requesting device may be mapped to a delay in delivering packets from the requesting device to the name server and/or from the name server to the requesting device. An overall delay time may be determined for each of the name servers. The overall delay time may correspond to the name server's delivering delay plus its response time. The first name server may order the name servers based on their overall delay times (e.g., from small delay time values to large delay time values). The first name server may select a predetermined number (e.g., five (5)) of top ranking name servers to be indicated in a message to the requesting device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, from a computing device and by a name server at a first level of a hierarchy of a Domain Name System (DNS), a request indicating a subdomain of a domain;
   determining, by the name server and based on data received from the computing device, a geographical region associated with the computing device;
   determining, by the name server, one or more second name servers based on:
   the geographical region associated with the computing device;
   geographical regions associated with other name servers at a second level of the hierarchy of the DNS;
   a first hash value associated with the computing device; and
   one or more second hash values associated with the other name servers, wherein the one or more second name servers are a subset of the other name servers; and
   sending, to the computing device, a message causing the computing device to send the request to a second name server of the one or more second name servers.

2. The method of claim 1, wherein the request comprises the data received from the computing device, and wherein the determining the geographical region associated with the computing device is based on the request.

3. The method of claim 1, wherein the determining the one or more second name servers comprises:
   comparing the geographical regions associated with the other name servers with the geographical region associated with the computing device.

4. The method of claim 1, wherein the determining the one or more second name servers comprises determining that the one or more second name servers are geographically located within a geographical distance threshold of the computing device.

5. The method of claim 1, wherein the determining the one or more second name servers comprises:
   determining, by the name server and based on hashing an Internet Protocol (IP) address of the computing device, the first hash value;
   determining, by the name server and based on hashing one or more DNS resource records indicating the other name servers, the one or more second hash values;
   determining, by the name server, an order of the first hash value and the one or more second hash values; and
   determining, by the name server and based on the order of the first hash value and the one or more second hash values, the subset of the other name servers,
   wherein the message indicates the subset.

6. The method of claim 1, further comprising:
   receiving, by the name server and from a second computing device, a second request indicating a second subdomain of the domain;
   based on determining that location information of the second computing device is not obtained within a time threshold, determining, by the name server, a plurality of third name servers at the second level of the hierarchy of the DNS; and
   sending, to the second computing device, a message indicating at least one third name server of the plurality of third name servers.

7. The method of claim 1, wherein the determining the geographical region associated with the computing device comprises:
   based on determining that location information of the computing device is not obtained within a time threshold, determining, by the name server, the other name servers at the second level of the hierarchy of the DNS;
   based on determining that a distance between two name servers of the other name servers meets or exceeds a distance threshold, increasing the time threshold; and
   determining the geographical region associated with the computing device based on location information, of the computing device, obtained within the increased time threshold.

8. The method of claim 1, wherein the determining the one or more second name servers comprises:
   grouping, based on geographical locations, a plurality of groups of the other name servers; and
   determining, based on selecting a second name server from each group of the plurality of groups, the one or more second name servers.

9. The method of claim 1, wherein the data received from the computing device comprises one or more of an internet protocol address, a media access control address, Global Positioning System (GPS) data, or text data of the request.

10. The method of claim 1, wherein the determining the one or more second name servers comprises:
    identifying a plurality of name servers associated with the geographical region; and
    after determining that the plurality of name servers lacks capacity to handle the request:
    identifying one or more additional name servers not associated with the geographical region; and selecting the one or more second name servers from the one or more additional name servers.

11. The method of claim 1, wherein the data is received separate from the request.

12. The method of claim 1, further comprising:
receiving, from the computing device and by the name server, a second request comprising a DNS query for the domain; and
sending, by the name server and to the computing device, an Internet Protocol (IP) address corresponding to the domain.

13. The method of claim 1, wherein the name server is an authoritative name server for the domain and the one or more second name servers are authoritative name servers for the subdomain of the domain.

14. The method of claim 1, wherein the request comprises a request to resolve a subdomain of the subdomain.

15. The method of claim 1, the method further comprising:
receiving, from the computing device and by the name server, a second request indicating a second name server of the one or more second name servers; and
sending, to the computing device and by the name server, a second message indicating an IP address of the second name server.

16. A method comprising:
receiving, from a computing device and by a name server of a Domain Name System (DNS), a request indicating a subdomain of a domain;
determining, by the name server, a plurality of second name servers, of the DNS, that are configured to respond to DNS queries of the subdomain;
receiving, from the computing device, location information associated with the computing device;
based on determining that the location information associated with the computing device is obtained by the name server within a time threshold that is based on location information associated with the plurality of second name servers, determining, by the name server, a subset of the plurality of second name servers; and
sending, by the name server and to the computing device, a message causing the computing device to send the request to at least one second name server of the subset.

17. The method of claim 16, further comprising:
storing, by the name server, a database table indicating different time thresholds that correspond to different distances between name servers.

18. The method of claim 16, further comprising:
based on determining, by the name server, that a distance between two second name servers of the plurality of second name servers meets or exceeds a distance threshold, increasing the time threshold.

19. The method of claim 16, further comprising:
based on determining, by the name server, that an average distance between second name servers of the plurality of second name servers meets or exceeds a distance threshold, increasing the time threshold.

20. The method of claim 16, wherein the determining the subset of the plurality of second name servers comprises determining, as members of the subset, servers, of the plurality of second name servers, located within a distance threshold of the computing device.

21. The method of claim 16, wherein the determining the subset of the plurality of second name servers comprises determining, as members of the subset, servers, of the plurality of second name servers, located in a geographical region associated with the computing device.

22. The method of claim 16, further comprising:
receiving, by the name server and from a second computing device, a second request indicating a second subdomain of the domain;
determining, by the name server, a plurality of third name servers, of the DNS, that are configured to respond to DNS queries of the second subdomain;
based on determining that location information associated with the second computing device is not obtained by the name server within a second time threshold that is based on location information associated with the plurality of third name servers, determining a second subset of the plurality of third name servers; and
sending, by the name server and to the second computing device, a message indicating the second subset.

23. The method of claim 16, wherein the determining the subset of the plurality of second name servers comprises:
grouping, by the name server and based on geographical locations of the plurality of second name servers, the plurality of second name servers into a plurality of groups; and
selecting, by the name server and from each group of the plurality of groups, a second name server to be included in the subset of the plurality of second name servers.

24. A method comprising:
receiving, from a computing device and by a name server at a first level of a hierarchy of a Domain Name System (DNS), a request indicating a subdomain of a domain;
determining, by the name server, a plurality of second name servers at a second level of the hierarchy of the DNS;
based on a distance between two of the plurality of second name servers, determining, by the name server and based on data received from the computing device, a geographical region associated with the computing device;
selecting, by the name server and based on the geographical region associated with the computing device, a subset of the plurality of second name servers; and
sending, by the name server and to the computing device, a message causing the computing device to send the request to at least one second name server of the subset of the plurality of second name servers.

25. The method of claim 24, wherein the selecting the subset of the plurality of second name servers comprises determining, as members of the subset, servers, of the plurality of second name servers, located within a distance threshold of the computing device.

26. The method of claim 24, wherein the determining the geographical region associated with the computing device is based on determining that the distance between the two of the plurality of second name servers satisfies a threshold.

* * * * *

UNITED STATES PATENT AND TRADEMARK OFFICE
CERTIFICATE OF CORRECTION

PATENT NO. : 11,706,188 B2  
APPLICATION NO. : 16/119231  
DATED : July 18, 2023  
INVENTOR(S) : Jeff Elsloo Page 1 of 1

It is certified that error appears in the above-identified patent and that said Letters Patent is hereby corrected as shown below:

In the Specification

Detailed description, Column 3, Line 12:
Delete "HTMLS," and insert --HTML5,--

Signed and Sealed this
Twenty-fourth Day of September, 2024

Katherine Kelly Vidal
*Director of the United States Patent and Trademark Office*